United States Patent
Kariya et al.

(10) Patent No.: US 10,874,998 B2
(45) Date of Patent: Dec. 29, 2020

(54) DIFFUSING MEMBER, EXHAUST GAS PURIFICATION DEVICE, AND USE OF DIFFUSING MEMBER IN EXHAUST GAS PURIFICATION DEVICE

(71) Applicant: IBIDEN CO., LTD., Ogaki (JP)

(72) Inventors: Satoru Kariya, Ibi-gun (JP); Fumiyuki Mutsuda, Ibi-gun (JP); Tomoyoshi Nakamura, Ibi-gun (JP); Yuya Sugiura, Takahama (JP); Yasutaka Ito, Takahama (JP)

(73) Assignee: IBIDEN CO., LTD., Ogaki (JP)

( * ) Notice: Subject to any disclaimer, the term of this patent is extended or adjusted under 35 U.S.C. 154(b) by 223 days.

(21) Appl. No.: 16/145,185

(22) Filed: Sep. 28, 2018

(65) Prior Publication Data

US 2019/0030498 A1 Jan. 31, 2019

Related U.S. Application Data

(63) Continuation of application No. PCT/JP2017/008609, filed on Mar. 3, 2017.

(30) Foreign Application Priority Data

Mar. 30, 2016 (JP) .................... 2016-069457

(51) Int. Cl.

| | | |
|---|---|---|
| *B01D 53/94* | (2006.01) | |
| *B01F 3/04* | (2006.01) | |
| *B01F 5/00* | (2006.01) | |
| *B01F 5/06* | (2006.01) | |
| *F01N 3/28* | (2006.01) | |
| *F01N 13/08* | (2010.01) | |
| *F01N 3/08* | (2006.01) | |
| *F01N 3/24* | (2006.01) | |
| *F01N 3/20* | (2006.01) | |
| *B01F 5/04* | (2006.01) | |
| *F01N 13/16* | (2010.01) | |

(52) U.S. Cl.
CPC ............ *B01F 5/00* (2013.01); *B01D 53/9431* (2013.01); *B01F 3/0446* (2013.01); *B01F 3/04049* (2013.01); *B01F 5/0057* (2013.01); *B01F 5/0473* (2013.01); *B01F 5/0618* (2013.01); *B01F 5/0688* (2013.01); *B01F 5/0693* (2013.01); *F01N 3/08* (2013.01); *F01N 3/208* (2013.01); *F01N 3/24* (2013.01); *F01N 3/2892* (2013.01); *F01N 13/08* (2013.01); *B01F 2005/0017* (2013.01); *B01F 2005/0097* (2013.01); *B01F 2005/0639* (2013.01); *F01N 13/16* (2013.01); *F01N 2240/20* (2013.01); *F01N 2260/18* (2013.01); *F01N 2450/22* (2013.01); *F01N 2510/08* (2013.01); *F01N 2530/02* (2013.01); *F01N 2570/14* (2013.01); *F01N 2610/02* (2013.01); *F01N 2610/1453* (2013.01); *Y02T 10/12* (2013.01)

(58) Field of Classification Search
CPC ........................ B01D 53/92; B01D 53/9409; B01D 53/9431; B01D 2251/2067; B01D 2257/402; B01D 2257/404; B01D 2258/012; F01N 3/10; F01N 3/18; F01N 3/20; F01N 3/206; F01N 3/2066; F01N 3/2892; F01N 2240/20; F01N 2260/06; F01N 2260/14; F01N 2570/14; F01N 2610/02; B01F 3/04; B01F 5/00; B01F 5/06

See application file for complete search history.

(56) References Cited

U.S. PATENT DOCUMENTS 6,074,619 A * 6/2000 Schoubye .......... B01D 53/9431
423/239.1

FOREIGN PATENT DOCUMENTS

| JP | 56-126433 | 10/1981 |
|---|---|---|
| JP | 08-128318 | 5/1996 |
| JP | 2001-516635 | 10/2001 |
| JP | 2005-199179 | 7/2005 |
| JP | 2006-104975 | 4/2006 |
| JP | 2008-280882 | 11/2008 |
| JP | 2012-206123 | 10/2012 |
| JP | 2015-172363 | 10/2015 |
| WO | WO 2007/065284 A1 * 6/2007 | ......... C04B 38/0615 |

* cited by examiner

*Primary Examiner* — Timothy C Vanoy
(74) *Attorney, Agent, or Firm* — Mori & Ward, LLP

(57) ABSTRACT

The diffusing member of the present invention is disposed in an exhaust pipe to partially block exhaust gas flowing in from upstream of the exhaust pipe, the diffusing member including a ceramic member and a metal member, wherein the ceramic member surrounds the metal member in such a manner that the metal member is partially exposed, and the volume of the ceramic member constituting the diffusing member is larger than the volume of the metal member constituting the diffusing member.

13 Claims, 4 Drawing Sheets

Cross-sectional view
taken along line A-A

Cross-sectional view
taken along line B-B

Cross-sectional view
taken along line C-C

Cross-sectional view
taken along line D-D

Cross-sectional view
taken along line E-E

Cross-sectional view
taken along line F-F

DIFFUSING MEMBER, EXHAUST GAS PURIFICATION DEVICE, AND USE OF DIFFUSING MEMBER IN EXHAUST GAS PURIFICATION DEVICE

TECHNICAL FIELD

The present invention relates to diffusing members, exhaust gas purification devices, and use of a diffusing member in an exhaust gas purification device.

BACKGROUND ART

Diesel engines entail generation of NOx. Thus, methods for removing NOx are required. A selective catalyst reduction system that uses urea as a reducing agent (urea SCR system) has been put into practical use for removal of NOx.

The urea SCR system injects a urea solution into an exhaust pipe. The injected urea solution undergoes hydrolysis and thermal degradation by heat of exhaust gas and is converted into ammonia, acting as a reducing agent that reduces NOx into $N_2$. Thus, sufficient reduction of NOx in exhaust gas requires sufficient mixing of the exhaust gas with ammonia as the reducing agent.

Sufficient mixing of exhaust gas in the exhaust pipe is important not only in the urea SCR system but also in cases where the urea SCR system is used in combination with various sensors.

In the above-described urea SCR system or the like, when the exhaust pipe has a sufficiently large inner diameter or when the exhaust pipe is sufficiently long, the exhaust gas is sufficiently mixed. However, due to restrictions on the structure of vehicles and other factors, it may not be possible to sufficiently increase the inner diameter of the exhaust pipe or to sufficiently elongate the length of the exhaust pipe. As a method for mixing exhaust gas in such cases, Patent Literature 1 discloses a method in which a static mixer is disposed in an exhaust pipe, and Patent Literature 2 discloses a method in which a mixer or swirler is disposed in an exhaust pipe to generate a swirl flow in the exhaust gas.

CITATION LIST

Patent Literature

Patent Literature 1: JP 2001-516635 T
Patent Literature 2: JP 2008-280882 A

SUMMARY OF INVENTION

Technical Problem

Unfortunately, use of the static mixer disclosed in Patent Literature 1 or the mixer and the swirler disclosed in Patent Literature 2 decreases the exhaust gas temperature because the thermal energy of exhaust gas is taken away by the static mixer, the mixer, and the swirler. When the exhaust gas temperature is lower than the operating temperature range of an exhaust gas purification catalyst disposed downstream, the purification effect may be insufficient. While Patent Literature 1 discloses a plastic or metal static mixer, plastic static mixers have drawbacks in terms of heat resistance and durability, and metal static mixers might be corroded by a urea solution or ammonia and also decrease the exhaust gas temperature as described above.

The urea SCR system injects a urea solution into an exhaust pipe, and the heat of exhaust gas causes hydrolysis, generating ammonia that acts as a reducing agent. At this time, if the temperature inside the exhaust pipe is too low, the hydrolysis and thermal degradation of the urea solution do not proceed properly, and by-products (hereinafter also referred to as by-products of the urea solution) are likely to be generated. The metal static mixer disclosed in Patent Literature 1, when used in the urea SCR system, not only reduces the efficiency of NOx purification reaction in a catalyst carrier due to a decrease in the exhaust gas temperature, but is also more susceptible to corrosion by the by-products of the urea solution since the by-products of the urea solution are more corrosive than ammonia. This has created a demand for a static mixer for use in the urea SCR system, which has measures not only against a decrease in the exhaust gas temperature but also against corrosion by by-products of the urea solution.

A plastic static mixer is less susceptible to the corrosion but cannot be directly fixed inside the exhaust pipe. Thus, fixing of the plastic static mixer requires, for example, fixing of the plastic static mixer to a different metal member and then welding the metal member inside the exhaust pipe.

Patent Literature 2 is completely silent about materials to produce the mixer or the swirler or a decrease in the exhaust gas temperature by the mixer or the swirler.

Solution to Problem

As a result of extensive studies in view of the above issues, the present inventors found that when the diffusing member is mostly made of ceramic and includes a metal portion that is partially exposed on the surface for connection to an exhaust pipe, such a diffusion member can suppress a decrease in the exhaust gas temperature as compared to metal diffusing members, has excellent corrosion resistance to by-products of a urea solution, and can also be easily joined to the exhaust pipe. The present invention was thus completed.

Specifically, the diffusing member of the present invention is disposed in an exhaust pipe to partially block exhaust gas flowing in from upstream of the exhaust pipe, the diffusing member including a ceramic member and a metal member, wherein the ceramic member surrounds the metal member in such a manner that the metal member is partially exposed, and the volume of the ceramic member constituting the diffusing member is larger than the volume of the metal member constituting the diffusing member.

The diffusing member of the present invention includes a ceramic member and a metal member, wherein the volume of the ceramic member is larger than the volume of the metal member. That is, the diffusing member is mainly formed of ceramic materials. Thus, the diffusing member can suppress a decrease in the exhaust gas temperature, as compared to diffusing members made of only metal.

Further, in the diffusing member of the present invention, the ceramic member surrounds the metal member in such a manner that the metal member is partially exposed. That is, the diffusing member of the present invention can be easily disposed in the exhaust pipe, for example, by welding the exposed parts of the metal member inside the exhaust pipe.

The diffusing member is less susceptible to corrosion by by-products of the urea solution because the surface of the region where the metal member is not exposed is covered with the ceramic member.

In the diffusing member of the present invention, the exposed area of the ceramic member is preferably larger than the exposed area of the metal member on an outermost surface of the diffusing member.

On the outermost surface of the diffusing member of the present invention, if the exposed area of the ceramic member is larger than the exposed area of the metal member, the heat of the exhaust gas is not easily transferred to the diffusing member, and the diffusing member is further less susceptible to corrosion by by-products of the urea solution.

In the diffusing member of the present invention, pores are preferably formed in the ceramic member.

The pores formed in the ceramic member block heat transfer in the ceramic member, thus achieving excellent thermal insulation and further suppressing a decrease in the exhaust gas temperature.

In the diffusing member of the present invention, the ceramic member preferably has a porosity of 5 to 60%.

The ceramic member having a porosity of 5 to 60% is particularly preferred because the mechanical strength of the diffusing member and the effect to suppress a decrease in the exhaust gas temperature can be achieved at the same time.

In the diffusing member of the present invention, preferably, no continuous pores are formed in the ceramic member.

If continuous pores are formed in the ceramic member, the ceramic member tends to have low mechanical strength. Further, if continuous pores are present, exhaust gas that came into contact with the diffusing member moves in the ceramic member and easily comes into contact with the metal member. Thus, in order to reduce or prevent corrosion of the metal member, preferably no continuous pores are formed in the ceramic member.

The continuous pores are pores that are continuously formed from the surface of the ceramic member with which exhaust gas may come into contact to the interface between the ceramic member and the metal member.

In the diffusing member of the present invention, the pores formed in the ceramic member are preferably closed pores.

When the pores formed in the ceramic member are closed pores, it is possible to prevent exhaust gas from penetrating into the ceramic member and corroding the metal member.

In the diffusing member of the present invention, the ceramic member preferably includes a crystalline inorganic material and/or an amorphous inorganic material.

The presence of the crystalline inorganic material in the ceramic member can improve the heat resistance and mechanical strength of the ceramic member.

The presence of the amorphous inorganic material in the ceramic member suppresses formation of coarse pores and continuous pores in the ceramic member. Thus, the contact between the metal member and exhaust gas is more easily suppressed.

Further, the ceramic member made of an amorphous inorganic material and a crystalline inorganic material can have improved heat resistance and mechanical strength because the crystalline inorganic material serves to mechanically strengthen the ceramic member made of the amorphous inorganic material.

In the diffusing member of the present invention, the crystalline inorganic material preferably includes at least one selected from the group consisting of alumina, silica, zirconia, zircon, yttria, calcia, magnesia, ceria, and hafnia.

When the crystalline inorganic material includes at least one selected from the group consisting of alumina, silica, zirconia, zircon, yttria, calcia, magnesia, ceria, and hafnia, the ceramic member containing such a crystalline inorganic material has excellent heat resistance and thermal insulation.

In the diffusing member of the present invention, the crystalline inorganic material preferably includes at least one selected from the group consisting of zirconia and zircon.

When the crystalline inorganic material includes at least one selected from the group consisting of zirconia and zircon, the ceramic member containing such a crystalline inorganic material has particularly excellent heat resistance and thermal insulation.

In the diffusing member of the present invention, preferably, the metal member is a mesh-like structure, and the ceramic member surrounds the mesh-like structure in such a manner that the mesh-like structure is partially exposed.

The diffusing member in the above-described form can be produced in innumerable shapes by adjusting the mesh size of the mesh-like structure and the amount of the ceramic member surrounding the mesh-like structure. Thus, diffusing members having different shapes corresponding to various exhaust pipes can be easily produced.

The exhaust gas purification device of the present invention includes an exhaust pipe through which exhaust gas containing nitrogen oxide flows, a urea injection device disposed upstream of the exhaust pipe and configured to inject urea into the exhaust pipe, and a catalyst carrier disposed downstream of the exhaust pipe, wherein at least one diffusing member of the present invention is disposed at an exhaust gas contact portion downstream of the urea injection device and upstream of the catalyst carrier, and the at least one diffusing member is welded at exposed parts of the metal member to the exhaust pipe.

In the exhaust gas purification device of the present invention, at least one diffusing member of the present invention is disposed at an exhaust gas contact portion downstream of the urea injection device and upstream of the catalyst carrier.

Thus, in the exhaust gas purification device of the present invention, the diffusing member is less susceptible to corrosion by by-products of the urea solution injected from the urea injection device, and a decrease in the exhaust gas temperature is suppressed. Thus, the SCR reaction in the catalyst carrier has good reaction efficiency. In addition, the diffusing member can be easily placed at the time of production.

When welding the exposed parts of the metal member of the diffusing member to the exhaust pipe, the metal member constituting the diffusing member may be directly welded to the exhaust pipe or may be welded by brazing.

In the exhaust gas purification device of the present invention, a ceramic coat layer is preferably formed at a welded part between the exposed parts of the metal member and the exhaust pipe to cover the welded part.

When the ceramic coat layer is formed at a welded part between the exposed parts of the metal member and the exhaust pipe to cover the welded part, the welded part can be made less susceptible to corrosion by by-products of the urea solution.

According to use of the diffusing member of the present invention, the diffusing member is used in an exhaust gas purification device including an exhaust pipe through which exhaust gas containing nitrogen oxide flows, a urea injection device disposed upstream of the exhaust pipe and configured to inject urea into the exhaust pipe, and a catalyst carrier disposed downstream of the exhaust pipe, wherein the diffusing member is disposed at an exhaust gas contact portion downstream of the urea injection device and upstream of the catalyst carrier, and the diffusing member partially blocks exhaust gas flowing in from upstream of the exhaust pipe, suppresses a decrease in the exhaust gas temperature when the urea injected from the urea injection device is sufficiently mixed with the exhaust gas to reduce unbalanced distribution of components in the exhaust gas, and prevents corrosion of the diffusing member by urea injected from the urea injection device and/or decomposed products of the urea.

As described above, the diffusing member of the present invention includes a ceramic member and a metal member, wherein the volume of the ceramic member is larger than the volume of the metal member. Thus, the diffusing member can suppress a decrease in the exhaust gas temperature, as compared to diffusing members made of only metal. Further, in the diffusing member of the present invention, the ceramic member surrounds the metal member in such a manner that the metal member is partially exposed. Thus, the diffusing member can be easily disposed in the exhaust pipe, for example, by welding the exposed parts of the metal member inside the exhaust pipe.

Thus, when the diffusing member of the present invention is used in an exhaust gas purification device including an exhaust pipe through which exhaust gas containing nitrogen oxide flows, a urea injection device disposed upstream of the exhaust pipe and configured to inject urea into the exhaust pipe, and a catalyst carrier disposed downstream of the exhaust pipe, the diffusing member, when disposed at an exhaust gas contact portion downstream of the urea injection device and upstream of the catalyst carrier, can suppress a decrease in the exhaust gas temperature when the urea injected from the urea injection device is sufficiently mixed with the exhaust gas to reduce unbalanced distribution of components in the exhaust gas, and prevent corrosion of the diffusing member by urea injected from the urea injection device and/or decomposed products of the urea. Herein, the decomposed products of the urea refer to ammonia and by-products of the urea solution.

In use of the diffusing member of the present invention, the diffusing member can be easily disposed in the exhaust pipe, for example, by welding the exposed parts of the metal member inside the exhaust pipe.

DESCRIPTION OF EMBODIMENTS

Figure 1A:
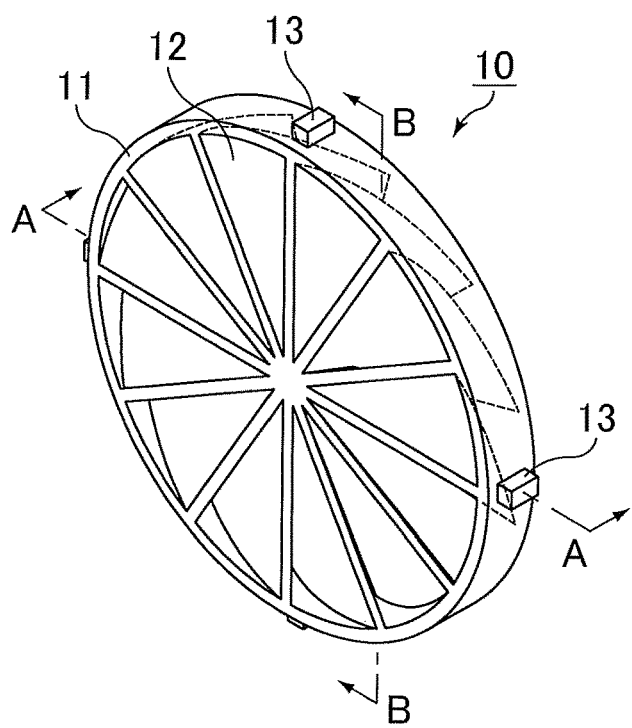
FIG. 1(a) is a schematic perspective view showing an exemplary diffusing member of the present invention.

The diffusing member of the present invention is described in detail below.

The diffusing member of the present invention includes a ceramic member and a metal member, wherein the volume of the ceramic member is larger than the volume of the metal member. In other words, the diffusing member is mainly formed of ceramic materials. Thus, the diffusing member can suppress a decrease in the exhaust gas temperature, as compared to diffusing members made of only metal.

In the diffusing member of the present invention, the ceramic member surrounds the metal member in such a manner that the metal member is partially exposed. That is, the diffusing member of the present invention can be easily disposed in the exhaust pipe, for example, by welding the exposed parts of the metal member inside the exhaust pipe.

In addition, the diffusing member is less susceptible to corrosion by by-products of the urea solution because the surface of the region where the metal member is not exposed is covered with the ceramic member.

The shape of the diffusing member of the present invention is descried.

The diffusing member of the present invention may have any shape as long as it can be disposed in the exhaust pipe and partially block exhaust gas flowing in from upstream of the exhaust pipe. Examples of the shape include one including blades that apply a force in a swirling direction to exhaust gas that flows in from upstream of the exhaust pipe, one including a mesh that divides the exhaust gas flowing in from upstream of the exhaust pipe into many streams and protrusions that change the exhaust gas flow direction, and one including a through-hole (also referred to as an orifice) that changes the exhaust gas flow into a turbulent flow.

The diffusing member of the present invention essentially includes no movable parts, but may include, for example, valves to release increased pressure of exhaust gas to form a new exhaust gas passage and a movable part or the like to move such valves or the like.

Examples of the shape of the diffusing member of the present invention include one including a cylindrical peripheral portion and multiple blades radially extending from a generally center of the peripheral portion. The metal member is preferably exposed at some portions of the cylindrical peripheral portion because the diffusing member including such exposed parts of the metal member can be easily disposed in an exhaust pipe by welding the exposed parts inside the exhaust pipe.

When exhaust gas passes through the diffusing member having such a shape, a force in a swirling direction is applied to the exhaust gas, and exhaust gas flows are mixed together. This makes it possible to reduce unbalanced distribution of components in the exhaust gas exhaust gas.

Examples of the shape of the diffusing member of the present invention include a disk shape including multiple holes penetrating front to back (also referred to as through-holes). The diffusing member having such a shape disposed in the exhaust pipe causes disturbance to the exhaust gas flow when exhaust gas that collided with the diffusing member passes through the through-holes, thus stirring the exhaust gas. A side of the disk (a surface where no through-holes are formed) may have exposed parts of the metal member.

The through-holes may have any shape, such as circular, oval, polygonal, or any other geometric shape. Two or more types of through-holes having different shapes and sizes may be used in combination.

Examples of the shape of the diffusing member of the present invention include a mesh-like structure having a network pattern. When the diffusing member is a mesh-like structure, the exhaust gas passage is divided when the exhaust gas passes through the mesh-like structure. The mesh-like structure may include, on one side thereof, protrusions protruding from a grid constituting the mesh-like structure, which change the exhaust gas passage. When the mesh-like structure includes such protrusions, the exhaust gas divided by the mesh collides with the protrusions and changes its flow direction. Here, for example, the protrusions may be aligned in the same direction so that the exhaust gas passage is changed only in one direction, or two or more types of protrusions oriented in different directions may be disposed so that the exhaust gas passage is changed in two or more directions. A suitable combination of protrusions that allow for different exhaust gas flow directions can improve the efficiency of mixing the exhaust gas flows.

In the diffusing member of the present invention, examples of materials constituting the metal member include aluminum, stainless-steel, steel, iron, copper, Inconel (trademark), Hastelloy (trademark), and Invar (trademark).

The metal member formed from any of these materials can improve the mechanical strength of the diffusing member and can also be easily joined to the exhaust pipe.

In the diffusing member of the present invention, the thermal expansion coefficient of the material constituting the metal member is preferably close to the thermal expansion coefficient of the material constituting the ceramic member. The difference in the thermal expansion coefficient between the material constituting the metal member and the material constituting the ceramic member is preferably $10.0 \times 10^{-6} K^{-1}$ or less.

In the diffusing member of the present invention, when the difference in the thermal expansion coefficient between the material constituting the metal member and the material constituting the ceramic member is $10.0 \times 10^{-6} K^{-1}$ or less, it is possible to reduce or prevent cracking attributable to the difference in the thermal expansion between the material constituting the metal member and the material constituting the ceramic member.

In the diffusing member of the present invention, the metal member may be formed from a continuous single metal member or multiple metal members.

For example, in the case of a metal member having a network pattern, the metal member may be formed from a continuous single metal material (e.g., punched metal sheet) or may be formed by weaving multiple metal wires (e.g., woven wire mesh).

In the case where the metal member constituting the diffusing member of the present invention is a punched metal sheet, the metal member is regarded as having a network pattern when the proportion of the area of the punched portion is 30% or more of the total area (total area of the punched portion and the metal portion) or as having a shape including through-holes when the proportion of the area of the punched portion is less than 30% of the total area, when the diffusing member is viewed from the exhaust gas flow direction.

In the case where the metal member constituting the diffusing member of the present invention has a network pattern or a shape including through-holes, the shape of the diffusing member is determined based on the proportion of the open space relative to the total area of the diffusing member when the diffusing member is viewed from the exhaust gas flow direction. That is, the diffusing member is regarded as having a network pattern when the proportion of the area of the open space (through-holes or cells) is 30% or more of the area defined by the outline of the diffusing member (total area of the diffusing member) or as having a shape including through-holes when the proportion of the area of the open space is less than 30% of the total area.

In the diffusing member of the present invention, the exposed area of the ceramic member is preferably larger than the exposed area of the metal member on an outermost surface of the diffusing member.

On the outermost surface of the diffusing member of the present invention, when the exposed area of the ceramic member is larger than the exposed area of the metal member, the heat of the exhaust gas is not easily transferred to the diffusing member and the diffusing member is further less susceptible to corrosion by by-products of the urea solution.

The proportions of the area of the ceramic member and the area of the metal member on the outermost surface of the diffusing member of the present invention can be visually determined. More accurate measurement can be obtained, if desired, by correcting image data of the diffusing member according to the shape of the diffusing member and performing calculations.

In the diffusing member of the present invention, the volume percent of the ceramic member and the volume percent of the metal member can be measured by observing a cross-section of the diffusing member including the ceramic member and the metal member, using a scanning electron microscope (SEM). The magnification of the SEM is adjusted such that the entire region of the ceramic member and the metal member in the thickness direction is within the viewing field. The magnification is 500 times for the ceramic member having a thickness of less than 300 μm; 200 times for a thickness of 300 μm or more than less than 500 μm; and 150 times for a thickness of 500 μm or more and less than 1000 μm. The magnification is 150 times or less for a thickness of 1000 μm or more.

The volumes of the metal member and the ceramic member are determined from the thickness of the ceramic member, the shape of a contact portion between the metal member and the ceramic member, and the external dimensions of the diffusing member, which are determined from a SEM image taken by the method described above. The number of SEM images is not particularly limited as long as the shapes of the ceramic member and the metal member are accurately grasped from the images. The number of measurement points may be suitably increased depending on the complexity of the shapes of the ceramic member and the metal member. The volume of the pores formed in the ceramic member is included in the volume of the ceramic member.

Whether or not continuous pores are formed in the ceramic member is determined from a SEM image of a cross-sectional view of the diffusing member cut in the normal direction of the surface of the metal member, which is taken under the same conditions as used in the method for measuring the volume of the ceramic member and the volume of the metal member. When none of the pores are continuous from the surface of the ceramic member to the surface of the metal member in each of ten SEM images taken randomly, it is determined that no continuous pores are formed in the ceramic member. When the ten SEM images selected randomly include even one pore that is continuous from the surface of the ceramic member to the surface of the metal member, it is determined that continuous pores are formed in the ceramic member.

In the diffusing member of the present invention, preferably, no gap is formed between the metal member and the ceramic member.

When no gap is formed between the metal member and the ceramic member, it results in improved adhesion between the metal member and the ceramic member.

In the diffusing member of the present invention, examples of the material constituting the ceramic member include amorphous inorganic materials and crystalline inorganic materials. Any one of these materials may be used alone, or a mixture or a composite of two or more of these materials may be used. In terms of thermal insulation and corrosion resistance of the ceramic member, the ceramic member preferably contains an amorphous inorganic material, more preferably contains an amorphous inorganic material and a crystalline inorganic material, and still more preferably contains a material in which particles of a crystalline inorganic material are dispersed in an amorphous inorganic material.

The presence of the crystalline inorganic material in the ceramic member can improve the heat resistance and mechanical strength of the ceramic member.

The presence of the amorphous inorganic material in the ceramic member suppresses formation of coarse pores and continuous pores in the ceramic member, so that contact between the metal member and exhaust gas is more easily suppressed.

In the diffusing member of the present invention, the presence of the amorphous inorganic material and the crystalline inorganic material in the material constituting the ceramic member can improve the heat resistance and mechanical strength of the ceramic member because particles of the crystalline inorganic material serve to mechanically strengthen the ceramic member.

In the diffusing member of the present invention, the presence of the crystalline inorganic material in the material constituting the ceramic member can prevent degradation of thermal insulation due to coalescence of pores because particles of the crystalline inorganic material prevent movement of the pores present in the ceramic member when the ceramic member is heated to a high temperature.

An increase in the mechanical strength of the ceramic member constituting the diffusing member of the present invention can reduce or prevent breakage of the ceramic member by impact from vibration of the exhaust pipe or by collision of foreign matter such as welding spatter contained in exhaust gas discharged from an engine.

In the diffusing member of the present invention, the ceramic member may include a first ceramic member and a second ceramic member formed on the surface of the first ceramic member.

Any of the materials constituting the ceramic member can be suitably used for the first ceramic member and the second ceramic member. For example, the ceramic member constituting the diffusing member of the present invention may include the first ceramic member made of a crystalline inorganic material and the second ceramic member made of an amorphous inorganic material, or may include the first ceramic member made of an amorphous inorganic material and the second ceramic member made of an amorphous inorganic material.

A method for producing the first ceramic member may be the same as or different from a method for producing the second ceramic member.

In the diffusing member of the present invention, the amorphous inorganic material that can be used as a material of the ceramic member preferably contains amorphous silica, more preferably 20% by weight or more of amorphous silica. Still more preferably, the amorphous inorganic material is low softening point glass having a softening point of 300° C. to 1000° C.

The low softening point glass may be of any type. Examples include soda lime glass, alkali-free glass, borosilicate glass, potash glass, crystal glass, titanium crystal glass, barium glass, strontium glass, aluminosilicate glass, soda-zinc glass, and soda-barium glass.

These types of the low softening point glass may be used alone or in combination of two or more thereof.

In the diffusing member of the present invention, when the amorphous inorganic material to be used as a material of the ceramic member is low softening point glass having a softening point of 300° C. to 1000° C., the low softening point glass can be easily melted or softened at a stage of forming the ceramic member. The molten or softened low-melting point glass tightly adheres to the surface of the metal member, so that the ceramic member having excellent adhesion to the metal member can be easily formed.

In the case where the metal member is made of aluminum and the ceramic member is directly formed on the surface of the metal member, the amorphous inorganic material is preferably low softening point glass having a softening point of 300° C. to 550° C.

When the amorphous inorganic material is low softening point glass having a softening point of 300° C. to 550° C., the amorphous inorganic material softens at a temperature lower than the melting temperature of aluminum constituting the metal member, so that the ceramic member can be formed without degrading the metal member.

If the softening point of the amorphous inorganic material is lower than 300° C., the softening point temperature is so low that the softened amorphous inorganic material will more easily flow due to melting or the like during heating treatment, making it difficult to obtain a ceramic member having a desired shape. In contrast, if the softening point of the amorphous inorganic material is higher than 1000° C., a very high heating treatment temperature is required, so that the metal member may have poor mechanical characteristics due to heating.

In the diffusing member of the present invention, the softening point of the amorphous inorganic material to be used as a material of the ceramic member can be measured using, for example, an automatic measuring apparatus of glass softening and strain points "SSPM-31" available from OPT Corp., based on the method specified in JIS R 3103-1:2001.

The borosilicate glass may be of any type, such as $SiO_2$—$B_2O_3$—$ZnO$ glass and $SiO_2$—$B_2O_3$—$Bi_2O_3$ glass. The crystal glass is glass containing PbO, and may be of any type, such as $SiO_2$—$PbO$ glass, $SiO_2$—$PbO$—$B_2O_3$ glass, and $SiO_2$—$B_2O_3$—$PbO$ glass. The barium glass may be of any type, such as $BaO$—$SiO_2$ glass.

The amorphous inorganic material may consist of a single type of the low softening point glass described above or may be a combination of different types of the low softening point glass.

Examples of the low softening point glass having a softening point of 300° C. to 550° C. include $SiO_2$—$TiO_2$ glass, $SiO_2$—$PbO$ glass, $SiO_2$—$PbO$—$B_2O_3$ glass, $B_2O_3$—$PbO$ glass, $Al_2O_3$—$SiO_2$—$B_2O_3$—$PbO$ glass, and $Na_2O$—$P_2O_5$—$SiO_2$ glass.

Subsequently, the crystalline inorganic material is described.

In the diffusing member of the present invention, when the ceramic member contains a crystalline inorganic material, the crystalline inorganic material is preferably formed from at least one selected from the group consisting of alumina, silica, zirconia, zircon, yttria, calcia, magnesia, ceria, hafnia, forsterite, steatite, cordierite, mullite, aluminum titanate, potassium titanate, and mica; is more preferably formed from at least one selected from the group consisting of alumina, silica, zirconia, zircon, yttria, calcia, magnesia, ceria, and hafnia; and is still more preferably from one selected from the group consisting of zirconia and zircon.

Further, in terms of mechanical strength and corrosion resistance of the ceramic member, the crystalline inorganic material preferably contains at least zirconia, more preferably 20% by weight or more of zirconia, still more preferably 50% by weight or more of zirconia.

The zirconia is preferably stabilized zirconia containing a stabilizing agent such as yttria, calcia, magnesia, alumina, or ceria.

Examples of the stabilized zirconia include yttria-stabilized zirconia, calcia-stabilized zirconia, magnesia-stabilized zirconia, alumina stabilized zirconia, and ceria-stabilized zirconia.

The amount of the stabilizing agent is preferably 5 to 30% by weight of the total amount of the stabilized zirconia.

A portion of zirconium forming zirconia may be replaced by hafnium.

The mica may be natural mica or artificial mica. The mica may be a composite of mica and other crystalline inorganic material(s). Examples of the composite of mica and other crystalline inorganic material (s) include Micarex (trademark) that is a hot-formed product of a mixture of mica and glass.

Silica is crystalline silica that may be mixed with amorphous silica. A product formed by mixing such crystalline silica with other crystalline inorganic material(s) and/or inorganic fibers, for example, and powder of the product may also be used.

Examples of the product formed by mixing of silica fine particles and inorganic fibers and the powder of such a product include Microtherm (trademark).

In the diffusing member of the present invention, the ceramic member may further contain inorganic fibers. Examples of the inorganic fibers include silica-alumina fibers, mullite fibers, alumina fibers, silica fibers, glass fibers, carbon fibers, silicon carbide fibers, silicon nitride fibers, zirconia fibers, and potassium titanate fibers.

The presence of the inorganic fibers in the ceramic member can improve the mechanical strength of the ceramic member.

Pores are preferably formed in the ceramic member constituting the diffusing member of the present invention.

Pores formed in the ceramic member block heat transfer in the ceramic member, thus achieving excellent thermal insulation and further suppressing a decrease in the exhaust gas temperature.

In the diffusing member of the present invention, the ceramic member preferably has a porosity of 5 to 60%, more preferably 10 to 55%, still more preferably 15 to 50%. In the diffusing member of the present invention, the ceramic member having a porosity of 5 to 60% is particularly preferred because the mechanical strength of the diffusing member and the effect to suppress a decrease in the exhaust gas temperature can be achieved at the same time.

When the ceramic member constituting the diffusing member of the present invention has a porosity of 5 to 60% and the pores in the ceramic member are uniformly dispersed, heat transfer in the ceramic member can be more effectively blocked, thus achieving particularly good thermal insulation.

The porosity of the ceramic member constituting the diffusing member of the present invention can be determined by the Archimedes method, specifically, by the following method, for example.

First, as a pretreatment, a sample subjected to porosity measurement is ultrasonically washed using ion-exchanged water and acetone, and then the sample is dried at 100° C.

Next, the pretreated sample is boiled with ion-exchanged water for three hours to prepare a saturated sample. Subsequently, the saturated sample is hung by a thread in water to measure the buoyancy of the saturated sample (W1) with an electronic balance. In addition, the mass of the saturated sample (W2) is measured with the electronic balance, and after the saturated sample is dried at 120° C. for 60 minutes, the mass of the dried sample (W3) is measured.

The porosity is calculated from the following formula, using the results obtained by the above method:

$$\{[\text{Mass of saturated sample}(W2)-\text{mass of dried sample }(W3)]/\text{buoyancy of saturated sample }(W1)\}\times 100(\%).$$

In the case where the ceramic member includes the first ceramic member and the second ceramic member, the porosity of the first ceramic member and the porosity of the second ceramic member are separately measured, the measured values are respectively multiplied by the volume percent of the first ceramic member and the volume percent of the second ceramic member constituting the entire ceramic member, and the resulting values are added together. The total value is regarded as the porosity of the ceramic member.

If the porosity of the ceramic member constituting the diffusing member of the present invention is less than 5%, the proportion of the pores is so small that the thermal insulation may be insufficient. In contrast, when the porosity of the ceramic member constituting the diffusing member of the present invention is more than 60%, the proportion of the pores is so large that the thermal insulation and mechanical strength tend to be low due to coalescence of pores.

The pores in the ceramic member constituting the diffusing member of the present invention can more reduce the heat transfer by radiation heat transfer and convective heat transfer when the average pore diameter of the pores is smaller. Specifically, the average pore diameter is preferably 0.1 to 150 µm, more preferably 0.1 to 50 µm, still more preferably 0.1 to 5 µm. The pores having an average pore diameter of 0.1 to 150 µm can more effectively block heat transfer in the ceramic member, and the ceramic member thus can maintain high thermal insulation.

It is technically difficult to form pores having an average pore diameter of less than 0.1 µm in the ceramic member constituting the diffusing member of the present invention. A special material, such as a very small pore-forming material, is required to form such pores. Unfortunately, this sharply increases the material cost. In contrast, if the pores in the ceramic member constituting the diffusing member of the present invention have an average pore diameter of more than 50 µm, the ceramic member has low mechanical characteristics because the solid portion in the ceramic member is small. In addition, pores having a diameter larger than 150 µm may reduce thermal insulation because the heat dissipation effect is promoted by convective heat transfer in the pores.

The average pore diameter of the pores in the ceramic member constituting the diffusing member of the present invention can be measured by observing a cross-section of the diffusing member, using a device such as a digital microscope or SEM.

Specifically, a digital microscope image or a SEM image is taken in such a manner that a specific region (500 μm×500 μm) of the ceramic member is within the viewing field, and the pore diameter of every pore in the specific region is measured, and an average value is determined as an average pore diameter. In the case of a pore that is not substantially spherical, the pore diameter is the projected area circle equivalent diameter (Heywood diameter).

In the case where the ceramic member includes the first ceramic member and the second ceramic member, the average pore diameter of the pores in the first ceramic member and the average pore diameter of the pores in the second ceramic member are separately measured, the measured values are respectively multiplied by the volume percent of the first ceramic member and the volume percent of the second ceramic member constituting the entire ceramic member, and the resulting values are added together. The total value is regarded as the average pore diameter of the pores in the ceramic member.

In the diffusing member of the present invention, preferably, no continuous pores are formed in the ceramic member.

If continuous pores are formed in the ceramic member, the ceramic member tends to have low mechanical strength. Further, if continuous pores are present, exhaust gas that came into contact with the diffusing member moves in the ceramic member and easily comes into contact with the metal member. Thus, in order to reduce or prevent corrosion of the metal member, preferably no continuous pores are formed in the ceramic member.

In the diffusing member of the present invention, the pores formed in the ceramic member are preferably closed pores.

When the pores formed in the ceramic member are closed pores, it is possible to prevent exhaust gas from penetrating into the ceramic member and corroding the metal member.

In the diffusing member of the present invention, the exposed area of the ceramic member is preferably larger than the exposed area of the metal member on an outermost surface of the diffusing member.

If the exposed area of the ceramic member is larger than the exposed area of the metal member on the outermost surface of the diffusing member, a decrease in the exhaust gas temperature can be effectively suppressed.

When the exposed area of the ceramic member is equal to or smaller than the exposed area of the metal member on the outermost surface of the diffusing member, the exposed area of the metal member is so large that the exhaust gas temperature may be excessively lowered. Further, since the metal member is susceptible to corrosion by by-products of the urea solution, the progress of corrosion of the diffusing member may not be sufficiently reduced or prevented.

In the diffusing member of the present invention, the surface roughness (Rzjis) of the ceramic member on the outermost surface of the diffusing member is preferably 0.1 to 10 μm.

The diffusing member in which the ceramic member on the outermost surface has a surface roughness (Rzjis) of 0.1 to 10 μm can sufficiently disturb the exhaust gas flow that passes through the surface of the diffusing member, and thus can sufficiently reduce unbalanced distribution of components in the exhaust gas exhaust gas.

The surface roughness (Rzjis) as used herein refers to the ten-point average roughness (Rz) specified in Annex JA of JIS B 0601-2013, which is measured by the method in accordance with JIS B 0601-1994.

The thermal expansion coefficients of the metal member and the ceramic member of the present invention refer to linear thermal expansion coefficients measured by the following method.

<Measurement Method of Thermal Expansion Coefficient>

The metal member and the ceramic member are cut into pieces having a size of 3 mm×3 mm×15 mm to obtain measurement samples. These measurement samples are placed in a measurement device (thermal dilatometer "TD5000SA" available from NETZSCH) to measure the thermal expansion coefficient.

The measurement conditions are as follows: air atmosphere; temperature increase rate: 10° C./rain; temperature range: 25° C. to 430° C.

The shape of the diffusing member of the present invention is described in further detail.

Figure 1B:
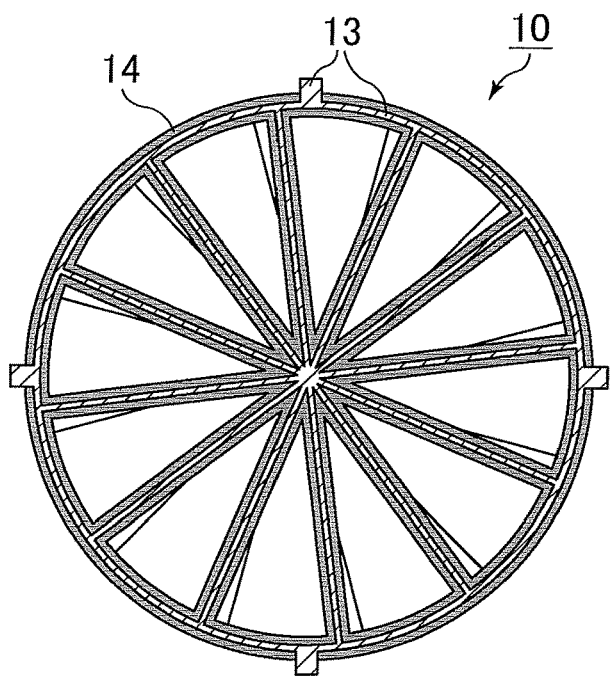
FIG. 1(b) is a cross-sectional view taken along line A-A of FIG. 1(a).
Figure 1C:
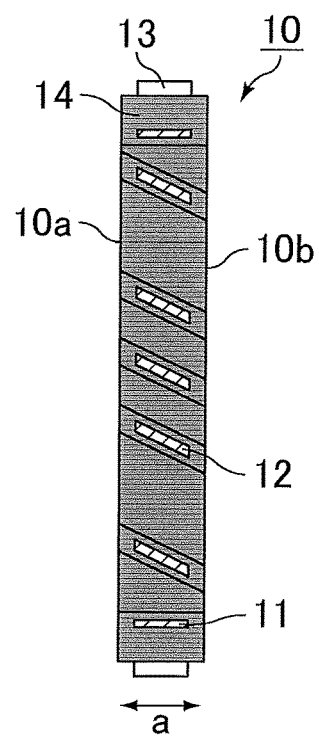
FIG. 1(c) is a cross-sectional view taken along line B-B of FIG. 1(a).

Examples of the shape of the diffusing member of the present invention include the shapes shown in FIG. 1(a), FIG. 1(b), and FIG. 1(c).

FIG. 1(a) is a schematic perspective view showing an exemplary diffusing member of the present invention. FIG. 1(b) is a cross-sectional view taken along line A-A of FIG. 1(a). FIG. 1(c) is a cross-sectional view taken along line B-B of FIG. 1(a).

A diffusing member 10 shown in FIG. 1(a) includes a cylindrical peripheral portion 11 and multiple blades 12 radially extending from a generally center of the peripheral portion 11. A metal member 13 partially protrudes externally from the cylindrical peripheral portion 11 to be exposed on the surface. As shown in FIG. 1(b), the diffusing member 10 is configured such that a ceramic member 14 surrounds the metal member 13. Further, portions of the metal member 13 constituting the peripheral portion 11 protrude externally from the peripheral portion 11 and are exposed on the outermost surface.

As shown in FIG. 1(c), the blades 12 are tilted at a specific degree relative to the exhaust gas flow direction (direction indicated by a double-headed arrow "a" in FIG. 1(c)). Exhaust gas that enters the diffusing member 10 flows into the diffusing member 10 from an exhaust gas inlet side end face 10a, and its passage is partially blocked by the blades 12. A force in the swirling direction is applied to the exhaust gas, and the exhaust gas flows out from an exhaust gas outlet side end face 10b. Thus, an exhaust gas flow in the swirling direction is generated on the exhaust gas outlet side of the diffusing member 10, and exhaust gas flows are mixed together, making it possible to reduce unbalanced distribution of components in the exhaust gas.

The metal member 13 constituting the diffusing member 10 is mostly covered with the ceramic member 14. Thus, even when the diffusing member 10 is disposed in the exhaust pipe, the metal member 13 is hardly exposed to exhaust gas that flows through the exhaust pipe, and corrosion by the exhaust gas hardly proceeds.

The outermost surface of the diffusing member 10 is mostly covered with the ceramic member, and the ceramic member has lower heat conductivity than the metal member, making it possible to suppress a decrease in the exhaust gas temperature.

In addition, since the diffusing member 10 includes the exposed parts of the metal member 13 on the outermost surface, the diffusing member 10 can be easily fixed in the exhaust pipe by welding the exposed parts of the metal member 13 to the exhaust pipe.

Figure 2A:
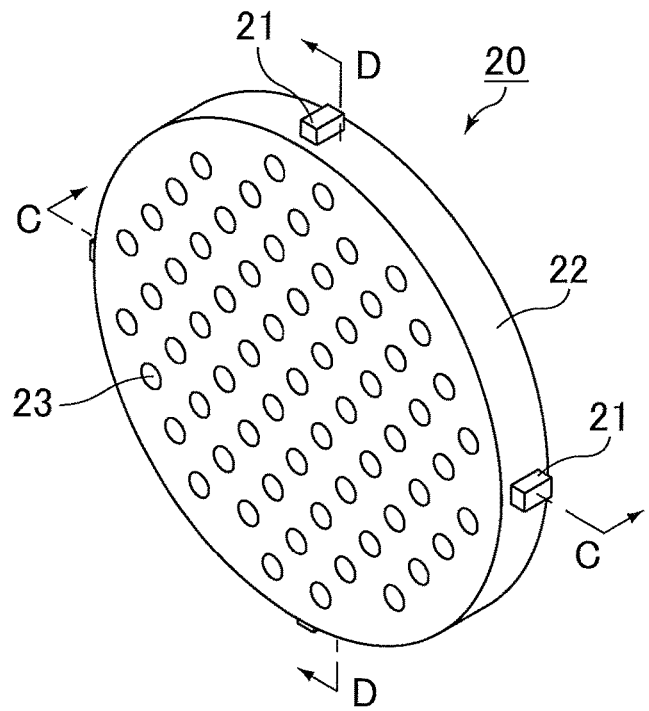
FIG. 2(a) is a schematic perspective view of another exemplary diffusing member of the present invention.
Figure 2B:
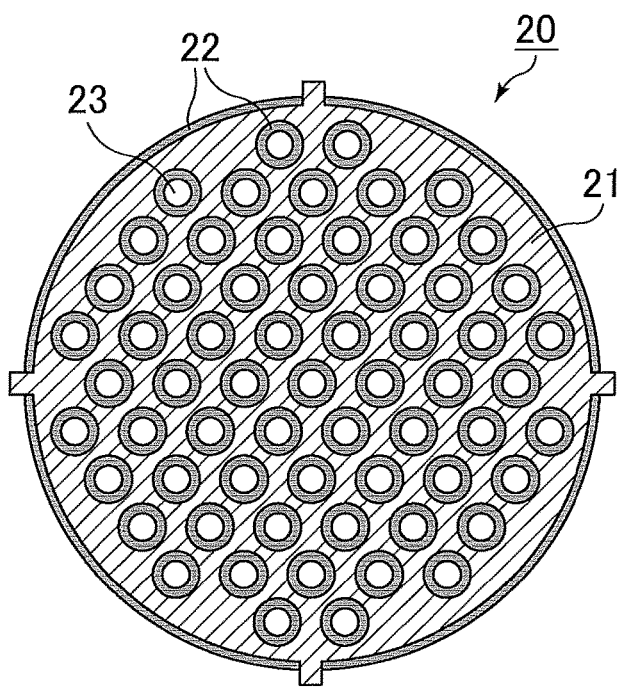
FIG. 2(b) is a cross-sectional view taken along line C-C of FIG. 2(a).
Figure 2C:
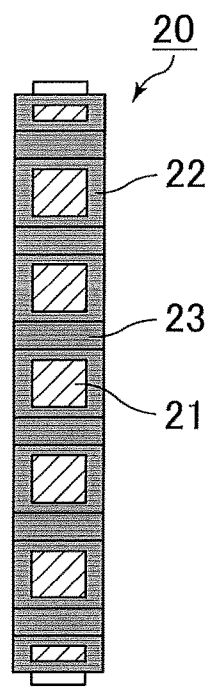
FIG. 2(c) is a cross-sectional view taken along line D-D of FIG. 2(a).

Examples of the shape of the diffusing member of the present invention include those shown in FIG. 2(*a*), FIG. 2(*b*), and FIG. 2(*c*).

FIG. 2(*a*) is a schematic perspective view of another exemplary diffusing member of the present invention. FIG. 2(*b*) is a cross-sectional view taken along line C-C of FIG. 2(*a*). FIG. 2(*c*) is a cross-sectional view taken along line D-D of FIG. 2(*a*).

A diffusing member 20 shown in FIG. 2(*a*) includes multiple holes 23 penetrating front to back. As shown in FIG. 2(*b*) and FIG. 2(*c*), the diffusing member 20 includes a disk-shaped metal member 21 including holes penetrating front to back, and a ceramic member 22 covering a large portion of the metal member 21. The diffusing member 20 disposed in the exhaust pipe causes disturbance to the exhaust gas flow because exhaust gas that collided with the diffusing member 20 tends to pass through the holes 23, thus stirring the exhaust gas.

The metal member 21 constituting the diffusing member 20 is mostly covered with the ceramic member 22. Thus, even when the diffusing member 20 is disposed in the exhaust pipe, the metal member 21 is hardly exposed to exhaust gas that flows through the exhaust pipe, and corrosion by the exhaust gas hardly proceeds.

The outermost surface of the diffusing member 20 is mostly covered with the ceramic member, and the ceramic member has lower heat conductivity than the metal member, making it possible to suppress a decrease in the exhaust gas temperature.

In addition, since the diffusing member 20 includes the exposed parts of the metal member 21 on the outermost surface, the diffusing member 10 can be easily fixed in the exhaust pipe by welding the exposed parts of the metal member 21 to the exhaust pipe.

Figure 3A:
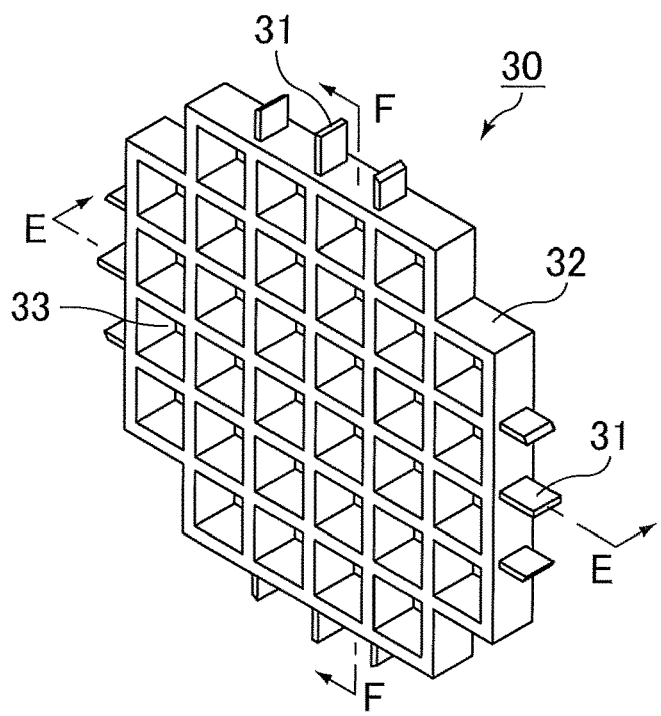
FIG. 3(a) is a schematic perspective view of still another exemplary diffusing member of the present invention.
Figure 3B:
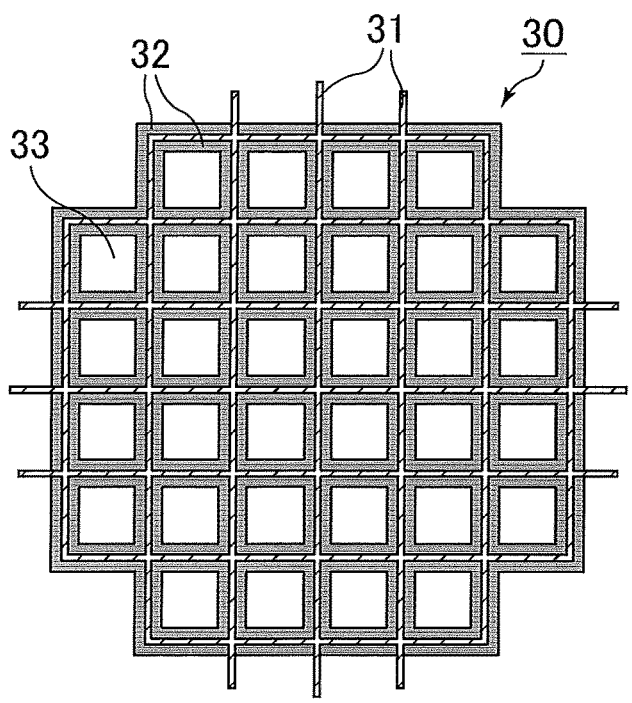
FIG. 3(b) is a cross-sectional view taken along line E-E of FIG. 3(a).
Figure 3C:
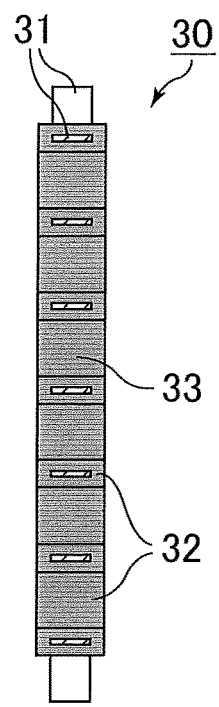
FIG. 3(c) is a cross-sectional view taken along line F-F of FIG. 3(a).

Examples of the shape of the diffusing member of the present invention include those shown in FIG. 3(*a*), FIG. 3(*b*), and FIG. 3(*c*). FIG. 3(*a*) is a schematic perspective view of still another exemplary diffusing member of the present invention. FIG. 3(*b*) is a cross-sectional view taken along line E-E of FIG. 3(*a*). FIG. 3(*c*) is a cross-sectional view taken along line F-F of FIG. 3(*a*).

A diffusing member 30 shown in FIG. 3(*a*) has a network pattern. The outermost surface is mostly covered with a ceramic member 32, and end portions 31*a* of a metal member 31 are partially exposed on the surface. As shown in FIG. 3(*b*) and FIG. 3(*c*), the diffusing member 30 includes the metal member 31 having a network pattern (also referred to as a mesh-like structure) and the ceramic member 32 surrounding the metal member 31. The end portions 31*a* of the metal member 31 are not covered with the ceramic member 32, and are exposed on the outermost surface of the diffusing member 30.

The diffusing member 30 disposed in the exhaust pipe causes disturbance to the exhaust gas flow because exhaust gas that collided with the diffusing member 30 tends to pass through cells 33 of the network pattern of the diffusing member 30, thus stirring the exhaust gas.

The metal member 31 constituting the diffusing member 30 is mostly covered with the ceramic member 32. Thus, even when the diffusing member 30 is disposed in the exhaust pipe, the metal member 31 is hardly exposed to exhaust gas that flows through the exhaust pipe, and corrosion by the exhaust gas hardly proceeds.

The outermost surface of the diffusing member 30 is mostly covered with the ceramic member, and the ceramic member has lower heat conductivity than the metal member, making it possible to suppress a decrease in the exhaust gas temperature.

In addition, since the diffusing member 30 includes the exposed parts of the metal member 31 on the outermost surface, the diffusing member 30 can be easily fixed in the exhaust pipe by welding the exposed parts of the metal member 31 to the exhaust pipe.

Next, a method for producing the diffusing member of the present invention is described.

Examples of the method for producing the diffusing member of the present invention include one in which a raw material composition as a raw material of the ceramic member (also referred to as a ceramic material) is applied to the surface of the metal member formed to have dimensions smaller than desired dimensions of the diffusing member, followed by drying and firing; one in which the metal member is placed in a die and the raw material composition is poured into the die, following by drying and firing; and one in which a material of the ceramic member is thermally sprayed onto the surface of the metal member to form a coating.

The ceramic member may not necessarily be formed on the surface of the metal member. For example, the metal member and the ceramic member may be separately produced first and assembled together at the end to produce the diffusing member.

[Metal Member Preparing Step]

The metal member can be obtained by forming a metal material as a raw material into a desired shape.

The metal member can be formed into a desired shape by a conventionally known metalworking technique, such as using a pressing machine or cutting process. Alternatively, multiple metal materials may be joined together by welding, for example.

In the method for producing the diffusing member of the present invention, in the metal member preparing step, washing treatment to remove impurities on the surface of the metal member may be performed if necessary. The washing treatment is not particularly limited, and any conventionally known washing treatment can be used. Specifically, a method such as ultrasonic washing in an alcohol solvent can be used.

In the method for producing the diffusing member of the present invention, in the metal member preparing step, roughening treatment to roughen the surface of the metal member may be performed if necessary. Roughening of the surface of the metal member increases the specific surface area of the metal member, thus improving the adhesion between the metal member and the ceramic member.

The above-described washing treatment may be performed after the roughening treatment.

[Ceramic Member Preparing Step]

The ceramic member may be formed by a method such as firing the raw material composition of the ceramic member or thermally spraying a raw material of the ceramic member onto the surface of the metal member to form a coating.

First, a description is given on a method in which a raw material composition is used.

In the case of applying a raw material composition of the ceramic member to the surface of the metal member and firing the raw material composition, application and firing of the raw material composition may be repeated several times to form layers of the ceramic member in stack.

In the case of producing the diffusing member of the present invention by the method using the raw material composition, the raw material composition as a raw material of the ceramic member may be a mixture of materials such as an amorphous inorganic material and/or a crystalline inorganic material with additives (as needed) such as an inorganic binder, an organic binder, a pore-forming material, a dispersion medium, and a forming auxiliary. Inorganic fibers or the like may be added to the raw material composition in order to improve the mechanical strength of the ceramic member.

In the case of producing the diffusing member of the present invention by the method using the raw material composition, examples of the inorganic binder that may be added to the raw material composition as a raw material of the ceramic member include alumina sol, silica sol, titania sol, water glass, sepiolite, attapulgite, and boehmite, and two or more thereof may be used in combination.

In the case of producing the diffusing member of the present invention by the method using the raw material composition, examples of the organic binder that may be added to the raw material composition as a raw material of the ceramic member include methyl cellulose, carboxymethyl cellulose, hydroxyethyl cellulose, polyethylene glycol, phenolic resin, and epoxy resin, and two or more thereof may be used in combination.

In the case of producing the diffusing member of the present invention by the method using the raw material composition, examples of the dispersion medium that may be added to the raw material composition as a raw material of the ceramic member include water and organic solvents such as methanol, ethanol, and acetone.

In the case of producing the diffusing member of the present invention by the method using the raw material composition, examples of the forming auxiliary that may be added to the raw material composition as a raw material of the ceramic member include ethylene glycol, dextrin, fatty acid, fatty acid soap, and polyalcohol, and two or more thereof may be used in combination.

In the case of producing the diffusing member of the present invention by the method using the raw material composition, examples of the pore-forming material that may be added to the raw material composition as a raw material of the ceramic member include balloons that are hollow microspheres containing oxide ceramics, spherical acrylic particles, and foaming agents such as carbon (e.g., graphite) and carbonate.

Preferred among these are foaming agents such as carbon (e.g., graphite) and carbonate because it is preferred that small-diameter pores are uniformly dispersed in the ceramic member in order to impart high thermal insulation to the ceramic member.

Examples of the carbonate foaming agent include $CaCO_3$, $BaCO_3$, $NaHCO_3$, $Na_2CO_3$, and $(NH_4)_2CO_3$.

Carbon such as graphite is more preferred among these pore-forming materials. Carbon treated by pulverization or the like can be dispersed in the form of fine particles in a coating material for the diffusing member, and can be decomposed by heating or firing to form pores having a suitable pore diameter.

In the case of producing the diffusing member of the present invention by the method using the raw material composition, production of the raw material composition for use in forming the ceramic member includes mixing the raw materials and wet-pulverizing the mixture. The amorphous inorganic material and crystalline inorganic material whose particles have been adjusted to a suitable particle diameter may be used, or the amorphous inorganic material and crystalline inorganic material whose particles have an intended particle diameter may be obtained by wet-pulverization after mixing the raw materials.

In the case of producing the diffusing member of the present invention by the method using the raw material composition, the final average particle diameter of the particles of the amorphous inorganic material constituting the raw material composition is preferably 0.1 to 100 μm, more preferably 1 to 20 μm. The particles having an average particle size in the range of 1 to 20 μm are easily uniformly dispersed, probably because the electricity charged on the surface does not much affect the particles.

In the case of producing the diffusing member of the present invention by the method using the raw material composition, the final average particle diameter of the particles of the crystalline inorganic material constituting the raw material composition is preferably 0.1 to 150 μm.

In the case of producing the diffusing member of the present invention by the method using the raw material composition, the average particle diameter of particles of the pore-forming material constituting the raw material composition is preferably 0.1 to 25 μm, more preferably 0.5 to 10 μm.

When the particles of the pore-forming material constituting the raw material composition have an average particle diameter of 0.1 to 25 μm, the average pore diameter of the pores in the ceramic member is easily adjustable to 0.1 to 150 μm.

In the case of producing the diffusing member of the present invention by the method using the raw material composition, if the average particle diameter of the particles of the pore-forming material constituting the raw material composition is less than 0.1 μm, it will be difficult to suitably disperse the particles of the pore-forming material in the raw material composition. As a result, the resulting pores in the ceramic member will have a low degree of dispersion, and the pores will easily coalesce when the temperature is high.

In contrast, in the case of producing the diffusing member of the present invention by the method using the raw material composition, if the average particle diameter of the particles of the pore-forming material constituting the raw material composition is more than 25 μm, the pores to be formed in the ceramic member will have too large a diameter, and the thermal insulation and mechanical strength of the ceramic member tend to decrease.

In producing the diffusing member of the present invention, examples of the method for forming the ceramic member around the metal member include one in which the above-described raw material composition is applied to the surface of the metal member.

Examples of the method for applying the raw material composition to the surface of the metal member include spray coating, electrostatic coating, inkjet printing, transfer printing using stamps or rollers, brush coating, and electrodeposition coating.

Alternatively, the metal member may be immersed in the raw material composition to apply the raw material composition to the surface of the metal member.

At this time, a region where the raw material composition is not applied is created on some parts of the metal member, whereby the metal member can be partially exposed on the surface of the diffusing member.

A region where the raw material composition is not applied on some parts of the metal member can be created by a conventionally known method such as one that uses masking tape or a masking agent such as masking sol.

The raw material composition applied to the surface of the metal member is turned into the ceramic member by heating and firing after drying.

The raw material composition can be dried with a dryer such as a microwave dryer, a hot-air dryer, a dielectric dryer, a reduced pressure dryer, a vacuum dryer, and a freeze dryer.

When the raw material composition contains organic matter such as an organic binder, the raw material composition may be degreased after drying.

Conditions for the degreasing treatment can be suitably selected depending on the type and amount of the organic matter contained in the raw material composition after drying. For example, heating at 200° C. to 500° C. for two to six hours is preferred.

The firing temperature varies depending on the physical properties of the crystalline inorganic material and the amorphous inorganic material constituting the raw material composition. Yet, when the amorphous inorganic material is contained, heating at a temperature equal to or higher than the softening point of the amorphous inorganic material is preferred.

Specifically, the temperature is not particularly limited as long as the metal member is not degraded, and is preferably 700° C. to 1100° C., more preferably 700° C. to 1000° C., still more preferably 750° C. to 950° C.

However, when the material constituting the metal member is aluminum and the raw material composition contains an amorphous inorganic material, preferably, the amorphous inorganic material is low softening point glass having a softening point of 300° C. to 550° C. and the raw material composition is heated at 300° C. to 600° C.

Subsequently, a method for producing the diffusing member of the present invention with thermal spraying is described.

Thermal spraying is a technique that melts or softens a material of a coating (also referred to as a thermal spraying material) by heating to obtain fine particles, and accelerates and sprays the material in the form of fine particles onto a surface of a workpiece.

Thermal spraying is considered to be capable of forming coatings of almost all materials as long as the materials are melted or softened by heating. Thus, the ceramic member constituting the diffusing member of the present invention can be easily formed by thermal spraying.

The thermal spraying material preferably contains a crystalline inorganic material, and may further contain an amorphous inorganic material and an inorganic binder.

The crystalline inorganic material constituting the thermal spraying material is more preferably zirconia or alumina. As for the composition of zirconia, more specific examples include calcia-stabilized zirconia (5 wt % $CaO-ZrO_2$, 8 wt % $CaO-ZrO_2$, 31 wt % $CaO—ZrO_2$), magnesia-stabilized zirconia (20 wt % $MgO-ZrO_2$, 24 wt % $MgO—ZrO_2$), yttria-stabilized zirconia (6 wt % $Y_2O_3-ZrO_2$, 7 wt % $Y_2O_3-ZrO_2$, 8 wt % $Y_2O_3-ZrO_2$, 10 wt % $Y_2O_3-ZrO_2$, 12 wt % $Y_2O_3-ZrO_2$, 20 wt % $Y_2O_3—ZrO_2$), zircon ($ZrO_2$-33 wt % $SiO_2$), and ceria-stabilized zirconia. The amount of the stabilizing agent is preferably 5 to 30% by weight of the total amount of the stabilized zirconia. A portion of zirconium forming zirconia may be replaced by hafnium.

In addition, as for the composition of the alumina, more specific examples include white alumina ($Al_2O_3$), gray alumina ($Al_2O_3$-1.5 to 4 wt % $TiO_2$), alumina-titania ($Al_2O_3$-13 wt % $TiO_2$, $Al_2O_3$-20 wt % $TiO_2$, $Al_2O_3$-40 wt % $TiO_2$, $Al_2O_3$-50 wt % $TiO_2$), alumina-yttria ($3Al_2O_3.5Y_2O_3$), alumina-magnesia ($Mg.Al_2O_4$), and alumina-silica ($3Al_2O_3.2SiO_2$).

Among these, zirconia having excellent heat resistance and corrosion resistance and having low heat conductivity (heat conductivity at 25° of 4 W/m·K or less) is preferred, and yttria-stabilized zirconia is more preferred.

The average particle diameter of particles of the crystalline inorganic material constituting the thermal spraying material is not particularly limited, but it is preferably 0.1 to 100 μm, more preferably 1 to 20 μm.

Suitable examples of the amorphous inorganic material that may be contained in the thermal spraying material include the same as those of the amorphous inorganic material constituting the ceramic member of the diffusing member of the present invention.

Examples of the inorganic binder that may be contained in the thermal spraying material include alumina sol, silica sol, titania sol, sodium silicate, sepiolite, attapulgite, and boehmite. Two or more of these may be used in combination.

Examples of the thermal spraying method include plasma spraying, flame spraying, high-velocity flame spraying, vacuum spraying, arc spraying, wire spraying, and detonation spraying. Among these, plasma spraying which can form a ceramic member having excellent heat resistance is preferred, and gas plasma spraying is more preferred.

In the method that uses gas plasma spraying, powder of the crystalline inorganic material constituting the ceramic member is thermally sprayed onto the surface of the metal member using gas plasma such as $Ar—H_2$ to form the ceramic member.

In the case of forming the ceramic member using gas plasma spraying, thermal spraying conditions such as thermal spraying current, thermal spraying voltage, thermal spraying distance, feed of powder, and amount of $Ar/H_2$ are suitably determined depending on the temperature of thermal spraying particles (particles of the molten or softened crystalline inorganic material) and the intended thickness of the ceramic member.

In the case of forming the ceramic member by thermal spraying, masking may be applied to a region on the metal member where it is not intended to form the ceramic member. A region where the ceramic member is not formed is created by masking, whereby the shape of ceramic member can be controlled. Examples of the method for masking include one that uses masking tape or a masking agent such as masking sol.

In the case of forming the ceramic member by thermal spraying, the material may be directly thermally sprayed onto the surface of the metal member to form the ceramic member, or the second ceramic member may be formed by thermal spraying on the surface of the first ceramic member that is formed by the above-described method that uses the raw material composition.

When forming the second ceramic member on the first ceramic member, it is more preferred that thermal spraying is performed while the amorphous inorganic material (such as glass) constituting the first ceramic member is soft as a result of heating of the first ceramic member. When thermal spraying is performed while the amorphous inorganic material constituting the first ceramic member is soft, thermal spraying particles that forma sprayed layer are pushed further into the first ceramic member, thus providing stronger adhesion between the first ceramic member and the second ceramic member.

In the method for producing the diffusing member of the present invention, the ceramic member formed around the metal member may be cut or polished if necessary. The shape of the diffusing member can be adjusted by cutting the ceramic member formed around the metal member. In addition, the surface roughness (Rzjis) of the ceramic member can be adjusted by polishing the ceramic member formed around the metal member.

The diffusing member of the present invention can be produced by the procedure described above.

The exhaust gas purification device of the present invention is described.

The exhaust gas purification device of the present invention includes an exhaust pipe through which exhaust gas containing nitrogen oxide flows, a urea injection device disposed upstream of the exhaust pipe and configured to inject urea into the exhaust pipe, and a catalyst carrier disposed downstream of the exhaust pipe, wherein at least one diffusing member of the present invention is disposed at an exhaust gas contact portion downstream of the urea injection device and upstream of the catalyst carrier.

In the exhaust gas purification device of the present invention, the diffusing member of the present invention having excellent heat resistance is disposed downstream of the urea injection device and upstream of the catalyst carrier. Thus, urea injected from the urea injection device can be sufficiently mixed with exhaust gas containing nitrogen oxide. Further, the diffusing member of the present invention includes a ceramic member and a metal member, wherein the volume of the ceramic member is larger than the volume of the metal member. Thus, the diffusing member can suppress a decrease in the exhaust gas temperature, as compared to diffusing members made of only metal. Further, in the diffusing member of the present invention, the ceramic member surrounds the metal member in such a manner that the metal member is partially exposed. Thus, the diffusing member can be easily disposed in the exhaust pipe, for example, by welding the exposed parts of the metal member inside the exhaust pipe. In addition, the diffusing member is less susceptible to corrosion by by-products of the urea solution because the surface of the region where the metal member is not exposed is covered with the ceramic member.

In the exhaust gas purification device of the present invention, the diffusing member is fixed inside the exhaust pipe by welding the metal member constituting the diffusing member, at the exposed parts of the metal member on the outermost surface, to the exhaust pipe.

The metal member constituting the diffusing member can be welded to the exhaust pipe by a conventionally known welding method such as arc welding, laser welding, resistance welding, or brazing.

Any of conventionally known exhaust pipes, urea injection devices, and catalyst carriers can be suitably used to constitute the exhaust gas purification device of the present invention.

In the exhaust gas purification device of the present invention, a ceramic coat layer is preferably formed at a welded part between the exposed parts of the metal member and the exhaust pipe to cover the welded part.

When the ceramic coat layer is formed at a welded part between the exposed parts of the metal member and the exhaust pipe to cover the welded part, the welded part can be made less susceptible to corrosion by by-products of the urea solution.

In the exhaust gas purification device of the present invention, when the diffusing member fixed inside the exhaust pipe includes exposed parts of the metal member, it is more preferred that the ceramic coat layer is also formed on such exposed parts so as to prevent the metal member from being exposed.

When a ceramic coat layer is formed on the exposed parts of the metal member of the diffusing member fixed inside the exhaust pipe, the metal member constituting the diffusing member will not be substantially exposed to exhaust gas, so that corrosion of the diffusing member by exhaust gas can be reduced or prevented.

In the exhaust gas purification device of the present invention, the ceramic coat layer that covers the welded part can be formed by applying a ceramic coating material as a raw material of the ceramic coat layer to the welded part and heating the ceramic coating material.

Suitable examples of the ceramic coating material include the same as those of the raw material of the ceramic member constituting the diffusing member of the present invention. More preferably, the ceramic coating material includes an amorphous inorganic material and a crystalline inorganic material.

The function of the diffusing member of the present invention is described in further detail.

Figure 4A:
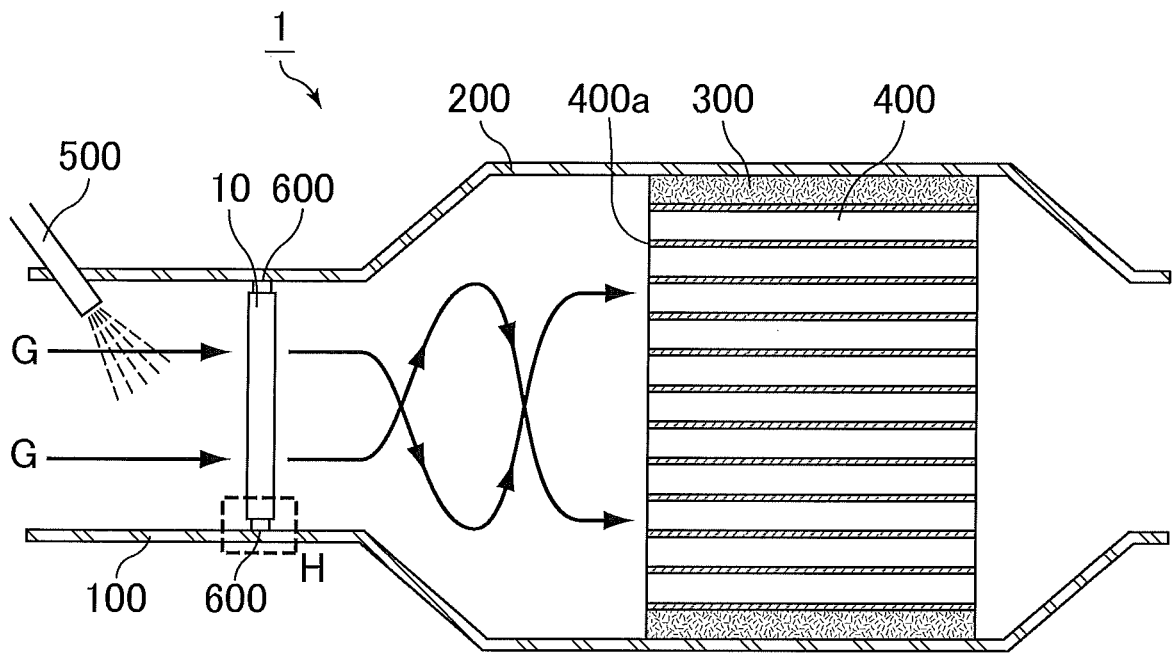
FIG. 4(a) is a schematic view of an exhaust gas purification device of the present invention.
Figure 4B:
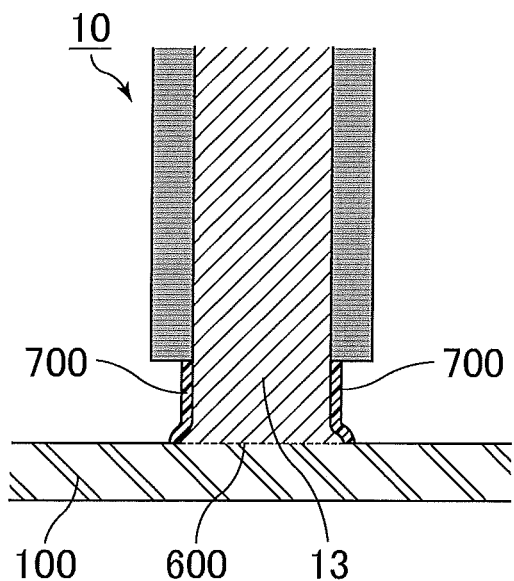
FIG. 4(b) is an expanded view of a dashed region H in FIG. 4(a).

FIG. 4(a) is a schematic view of an exhaust gas purification device of the present invention. FIG. 4(b) is an expanded view of a dashed region H in FIG. 4(a).

As shown in FIG. 4(a), an exhaust gas purification device 1 includes an exhaust pipe 100 through which exhaust gas flows, a urea injection device 500 disposed upstream of the exhaust pipe 100 and configured to inject urea into the exhaust pipe 100, and a catalyst carrier 400 disposed downstream of the exhaust pipe 100, wherein the diffusing member 10 is disposed at an exhaust gas contact portion downstream of the urea injection device 500 and upstream of the catalyst carrier 400.

In the case where the diffusing member 10 is disposed in the exhaust pipe 100, when exhaust gas flowing in from upstream of the exhaust pipe passes through the diffusing member 10, the flow thereof is partially blocked and rotates in the swirling direction (the exhaust gas flow is schematically indicated by arrow G).

Thus, the exhaust gas that passed through the diffusing member 10 flows into a casing 200 while swirling. Therefore, by the time the exhaust gas reaches an exhaust gas inlet side end face 400a of the catalyst carrier 400 disposed inside the casing 200 with a holding seal material 300, unbalanced distribution of components in the exhaust gas exhaust gas and/or unbalanced temperature distribution will be reduced.

The urea solution injected from the urea injection device 500 reaches the catalyst carrier 400 in the state of being sufficiently dispersed in the exhaust gas, allowing the urea SCR system to sufficiently function. In the diffusing member 10, the volume of the ceramic member is larger than the volume of the metal member, so that heat of the exhaust gas is not easily transferred to the diffusing member, and a decrease in the exhaust gas temperature can be suppressed.

Further, as shown in FIG. 4(b), the metal member 13 constituting the diffusing member 10 is welded to the exhaust pipe 100, forming a welded part 600. The surfaces of the welded part 600 and the metal member 13 are covered with a ceramic coat layer 700.

Based on the reasons described above, the diffusing member of the present invention can be suitably used in an exhaust gas purification device including an exhaust pipe through which exhaust gas containing nitrogen oxide flows, a urea injection device disposed upstream of the exhaust pipe and configured to inject urea into the exhaust pipe, and a catalyst carrier disposed downstream of the exhaust pipe, wherein the diffusing member is disposed at an exhaust gas contact portion downstream of the urea injection device and upstream of the catalyst carrier, and the diffusing member partially blocks exhaust gas flowing in from upstream of the exhaust pipe, suppresses a decrease in the exhaust gas temperature when the urea injected from the urea injection device is sufficiently mixed with the exhaust gas to reduce unbalanced distribution of components in the exhaust gas, and prevents corrosion of the diffusing member by urea injected from the urea injection device and/or decomposed products of the urea.

The catalyst carrier for use in the exhaust gas purification device may be a catalyst carrier that is conventionally used in this field, such as a ceramic honeycomb catalyst carrier.

The diffusing member can effectively reduce unbalanced distribution of components in the exhaust gas exhaust gas and/or unbalanced temperature distribution even in an exhaust pipe not provided with a urea injection device.

The effects of the diffusing member of the present invention are listed below.

(1) The diffusing member of the present invention includes a ceramic member and a metal member, wherein the volume of the ceramic member is larger than the volume of the metal member. Thus, the diffusing member can suppress a decrease in the exhaust gas temperature, as compared to diffusing members made of only metal.

(2) In the diffusing member of the present invention, the ceramic member surrounds the metal member in such a manner that the metal member is partially exposed. Thus, the diffusing member can be easily disposed in the exhaust pipe, for example, by welding the exposed parts of the metal member inside the exhaust pipe.

(3) The diffusing member of the present invention is less susceptible to corrosion by by-products of the urea solution because the surface of the region where the metal member is not exposed is covered with the ceramic member.

(4) The exhaust gas purification device of the present invention includes a diffusing member including a ceramic member and a metal member, wherein the volume of the ceramic member is larger than the volume of metal member. The diffusing member is less likely to absorb thermal energy of exhaust gas, and a decrease in the exhaust gas temperature can thus be suppressed.

(5) As described above, the diffusing member of the present invention can sufficiently mix the urea injected from the urea injection device with exhaust gas containing nitrogen oxide to reduce unbalanced distribution of components in the exhaust gas and can also suppress a decrease in the exhaust gas temperature. Thus, the diffusing member can be suitably used in an exhaust gas purification device including an exhaust pipe through which exhaust gas containing nitrogen oxide flows, a urea injection device disposed upstream of the exhaust pipe and configured to inject urea into the exhaust pipe, and a catalyst carrier disposed downstream of the exhaust pipe, wherein the diffusing member is disposed at an exhaust gas contact portion downstream of the urea injection device and upstream of the catalyst carrier.

REFERENCE SIGNS LIST 1 exhaust gas purification device
10, 20, 30 diffusing member
11 peripheral portion
12 blade
13, 21, 31 metal member
14, 22, 32 ceramic member
23 hole
33 cell
100 exhaust pipe
200 casing
300 holding seal material
400 catalyst carrier
500 urea injection device
600 welded part
700 ceramic coat layer

The invention claimed is:

1. A diffusing member to be disposed in an exhaust pipe to partially block exhaust gas flowing in from upstream of the exhaust pipe, the diffusing member comprising:
   a ceramic member; and
   a metal member,
   wherein the ceramic member surrounds the metal member in such a manner that the metal member is partially exposed,
   the volume of the ceramic member constituting the diffusing member is larger than the volume of the metal member constituting the diffusing member, and
   the exposed area of the ceramic member is larger than the exposed area of the metal member on an outermost surface of the diffusing member.

2. The diffusing member according to claim 1, wherein pores are formed in the ceramic member.

3. The diffusing member according to claim 2, wherein the ceramic member has a porosity of 5 to 60%.

4. The diffusing member according to claim 2, wherein no continuous pores are formed in the ceramic member.

5. The diffusing member according to claim 2, wherein the pores formed in the ceramic member are closed pores.

6. The diffusing member according to claim 1, wherein the ceramic member comprises a crystalline inorganic material and/or an amorphous inorganic material.

7. The diffusing member according to claim 6, wherein the crystalline inorganic material comprises at least one selected from the group consisting of alumina, silica, zirconia, zircon, yttria, calcia, magnesia, ceria, and hafnia.

8. The diffusing member according to claim 6, wherein the crystalline inorganic material comprises at least one selected from the group consisting of zirconia and zircon.

9. The diffusing member according to claim 1, wherein the metal member is a mesh-like structure, and the ceramic member surrounds the mesh-like structure in such a manner that the mesh-like structure is partially exposed.

10. An exhaust gas purification device comprising:
    an exhaust pipe through which exhaust gas containing nitrogen oxide flows;
    a urea injection device disposed upstream of the exhaust pipe and configured to inject urea into the exhaust pipe; and
    a catalyst carrier disposed downstream of the exhaust pipe,
    wherein at least one diffusing member according to claim 1 is disposed at an exhaust gas contact portion downstream of the urea injection device and upstream of the catalyst carrier, and
    the at least one diffusing member is welded at exposed parts of the metal member to the exhaust pipe.

11. An exhaust gas purification device comprising:
    an exhaust pipe through which exhaust gas containing nitrogen oxide flows;

a urea injection device disposed upstream of the exhaust pipe and configured to inject urea into the exhaust pipe; and a catalyst carrier disposed downstream of the exhaust pipe, wherein at least one diffusing member is disposed at an exhaust gas contact portion downstream of the urea injection device and upstream of the catalyst carrier, the at least one diffusing member is disposed in the exhaust pipe to partially block the exhaust gas flowing in from upstream of the exhaust pipe, the at least one diffusing member comprising:

a ceramic member; and a metal member, the ceramic member surrounds the metal member in such a manner that the metal member is partially exposed, the volume of the ceramic member constituting the at least one diffusing member is larger than the volume of the metal member constituting the at least one diffusing member, the at least one diffusing member is welded at exposed parts of the metal member to the exhaust pipe, and a ceramic coat layer is formed at a welded part between the exposed parts of the metal member and the exhaust pipe to cover the welded part.

12. A diffusing member to be disposed in an exhaust pipe to partially block exhaust gas flowing in from upstream of the exhaust pipe, the diffusing member comprising:

a ceramic member; and a metal member, wherein the ceramic member surrounds the metal member in such a manner that the metal member is partially exposed, the volume of the ceramic member constituting the diffusing member is larger than the volume of the metal member constituting the diffusing member, the ceramic member comprises a crystalline inorganic material and/or an amorphous inorganic material, and the crystalline inorganic material comprises at least one selected from the group consisting of zirconia and zircon.

13. A diffusing member to be disposed in an exhaust pipe to partially block exhaust gas flowing in from upstream of the exhaust pipe, the diffusing member comprising:

a ceramic member; and a metal member, wherein the ceramic member surrounds the metal member in such a manner that the metal member is partially exposed, the volume of the ceramic member constituting the diffusing member is larger than the volume of the metal member constituting the diffusing member, the metal member is a mesh-like structure, and the ceramic member surrounds the mesh-like structure in such a manner that the mesh-like structure is partially exposed.

* * * * *